United States Patent [19]

Walter et al.

[11] Patent Number: 4,988,740

[45] Date of Patent: Jan. 29, 1991

[54] LOW DENSITY FOAMED THERMOPLASTIC ELASTOMERS

[75] Inventors: Timothy H. Walter, Wilmington, Del.; Thomas M. Pontiff, Gansevoort, N.Y.

[73] Assignee: E. I. du Pont de Nemours and Company, Wilmington, Del.

[21] Appl. No.: 366,555

[22] Filed: Jun. 15, 1989

[51] Int. Cl.$^5$ .................. C08J 9/14; C08L 67/00; C08L 77/00
[52] U.S. Cl. .................................. 521/138; 521/98; 521/182; 525/437; 528/292
[58] Field of Search .................. 521/182, 138, 92, 97, 521/93; 525/437; 524/101; 528/292

[56] References Cited

U.S. PATENT DOCUMENTS

| | | | |
|---|---|---|---|
| 4,280,005 | 7/1981 | Fox | 521/182 |
| 4,323,528 | 4/1982 | Collins | 264/53 |
| 4,351,911 | 9/1982 | Fox | 521/138 |
| 4,588,754 | 5/1986 | Liu | 521/92 |

OTHER PUBLICATIONS

Hytrel ® Polyester Elastomer Bulletin IF-HY-T-390.035.

*Primary Examiner*—Morton Foelak

[57] ABSTRACT

A foamed thermoplastic elastomer having a substantially uniform closed cell structure and having a specific gravity of less than about 01.40, an energy return ratio greater than about 0.50 when compressed and released said foam being prepared from a thermoplastic multi-block copolymer elastomer having a Shore D hardness of 25-75.

8 Claims, No Drawings

LOW DENSITY FOAMED THERMOPLASTIC ELASTOMERS

BACKGROUND OF INVENTION

This invention relates to a low density, closed cell foamed thermoplastic multi-block copolymer elastomer.

Thermoplastic polymers that have been foamed heretofore were not of sufficiently low density, nor have a substantially uniform cell structure to be entirely satisfactory for the manufacture of components for athletic shoes and other sporting equipment, such as innersoles for shoes and helmet padding nor for use as packaging material for delicate equipment, such as electronic equipment, that is subjected to severe vibrations. Prior art foamed polymers were deficient in strength and the foamed polymers did not have sufficient energy return ratios. The present invention provides a foamed thermoplastic elastomer having a low density, high strength, and a high energy return ratio.

SUMMARY OF THE INVENTION

It has now been discovered that certain thermoplastic multi-block copolymer elastomers that can be foamed to a low density are especially suitable for components for athletic shoes, e.g., innersoles and other sporting equipment and packaging material. More specifically, the present invention is directed to a foamed thermoplastic elastomer having a substantially uniform cell structure which comprises a foamed thermoplastic multi-block copolymer elastomer having a closed cell structure and having a specific gravity of less than about 0.40, an energy return ratio greater than about 0.50, preferably greater than about 0.60, when compressed and released, as determined by the recommended method of ASTM Committee F08.54 on athletic footwear, said foam being prepared from a thermoplastic multi-block copolymer elastomer having a Shore D hardness of from about 25–75 and selected from the group consisting of (1) copolyetheresters, (2) copolyesteresters, (3) copolyetherimide esters, and (4) copolyetheramides, said thermoplastic foam being prepared by mixing said multi-block copolymer elastomer at a temperature above its melting point to form a molten mass with a gaseous or low-boiling liquid foaming agent at a pressure sufficient to dissolve and/or disperse said foaming agent in said molten elastomer and extruding the resulting mixture through an orifice into a lower pressure zone whereupon substantially free and uniform foaming and expansion occur and the elastomer solidifies.

The thermoplastic multi-block copolymer elastomer used to make the foam, preferably have a melt index not greater than 10 g/10 minutes by the procedure described in ASTM D1238 (2.16 kg wt.). Most preferably, the thermoplastic multi-block elastomer has a melt index no greater than 6 g/10 minutes.

The resulting foam thermoplastic elastomer has a surprisingly high energy return ratio.

DETAILED DESCRIPTION OF THE INVENTION

The foamed thermoplastic multi-block copolymer elastomers have a specific gravity less than about 0.4, preferably no greater than 0.35, and an energy return ratio greater than 0.50 preferably greater than 0.60, provided that the Shore D hardness of the multi-block copolymer elastomer used to make the foam is from 25–75. The foamed elastomers of the present invention are especially useful as packaging material and components in athletic shoes and sports equipment.

The thermoplastic multi-block copolymer elastomers that are used in this invention to form a thermoplastic foam are (a) copolyetheresters, (b) copolyesteresters, (c) copolyetherimide esters, and (d) copolyetheramides. The four types of elastomers are similar to one another in that they all consist of repeating hard segments which are relatively high melting polyester or polyamide segments and repeating soft segments which are relatively low melting polyether or polyester segments. The four types of polymers described below are well known in the industry.

The copolyetheresters (a) consist essentially of a multiplicity of recurring long chain ester units and short chain ester units joined head-to-tail through ester linkages, said long chain ester units being represented by the formula

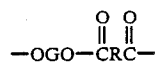 (I)

and said short chain ester units being represented by the formula

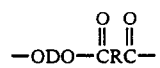 (II)

where G is a divalent radical remaining after the removal of terminal hydroxyl groups from a poly(alkylene oxide) glycol having a number average molecular weight of about 400–6000 and a carbon to oxygen atomic ratio of about 2.0–4.3; R is a divalent radical remaining after removal of carboxyl groups from an aromatic dicarboxylic acid having a molecular weight less than about 300, and D is a divalent radical remaining after removal of hydroxyl groups from a diol having a molecular weight less than about 250; provided said short chain ester units amount to about 20–85 percent by weight of said copolyetherester.

The term "long-chain ester units" as applied to units in a polymer chain of the copolyetherester refers to the reaction product of a long-chain glycol with a dicarboxylic acid. Such "long-chain ester units", which are a repeating unit in the copolyetheresters, correspond to formula (I) above. The long-chain glycols are polymeric glycols having terminal (or as nearly terminal as possible) hydroxy groups and a molecular weight from about 400–6000. The long-chain glycols used to prepare the copolyetheresters are poly(alkylene oxide) glycols having a carbon-to-oxygen atomic ratio of about 2.0–4.3. Representative long-chain glycols are poly(ethylene oxide) glycol, poly(1,2- and 1,3-propylene oxide) glycol, poly(tetramethylene oxide) glycol, random or block copolymers or ethylene oxide and 1,2-propylene oxide, and random or block copolymers of tetrahydrofuran with minor amounts of a second monomer such as ethylene oxide.

The term "short-chain ester units" as applied to units in a polymer chain of the copolyetherester refers to low molecular weight chain units having molecular weights less than about 550. They are made by reacting a low molecular weight diol (below about 250) with an aromatic dicarboxylic acid having a molecular weight below about 300, to form ester units represented by formula (II) above.

The term "low molecular weight diols" as used herein should be construed to include equivalent ester-forming derivatives, provided, however, that the molecular weight requirement pertains to the diol only and not to its derivatives.

Preferred are diols with 2–15 carbon atoms such as ethylene, propylene, tetramethylene, pentamethylene, 2,2-dimethyltrimethylene, hexamethylene, and decamethylene glycols, dihydroxycyclohexane, cyclohexane dimethanol, and the unsaturated 1,4-butenediol.

The term "dicarboxylic acids" as used herein, includes equivalents of dicarboxylic acids having two functional groups which perform substantially like dicarboxylic acids in reaction with glycols and diols in forming copolyetherester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyetherester polymers, those with 8–16 carbon atoms are preferred, particularly the phenylene dicarboxylic acids, i.e., phthalic, terephthalic and isophthalic acids and their dimethyl esters.

The short-chain ester units will constitute about 20–85 weight percent of the copolyetherester. The remainder of the copolyetherester will be long-chain ester units comprising about 15–80 weight percent of the copolyetherester.

Preferred copolyetheresters are those prepared from dimethyl terephthalate, 1,4-butanediol, and poly(tetramethylene oxide) glycol having a molecular weight of about 600–2000. Optionally, up to about 30 mole percent of the dimethyl terephthalate in these polymers can be replaced by dimethyl phthalate or dimethyl isophthalate. Polymers in which a portion of the butanediol is replaced by butenediol are also preferred.

The dicarboxylic acids or their derivatives and the polymeric glycol are incorporated into the copolyetherester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated depends on their molar concentration, boiling points and relative reactivities. The total amount of diol incorporated is still the difference between moles of diacid and polymeric glycol.

The copolyetheresters described herein are made by a conventional ester interchange reaction which, preferably, takes place in the presence of a phenolic antioxidant that is stable and substantially nonvolatile during the polymerization.

A preferred procedure involves heating the dimethyl ester of terephthalic acid with a long-chain glycol and 1,4-butanediol in a molar excess and a phenolic antioxidant and hindered amine photostabilizer in effective concentrations in the presence of a catalyst at about 150°–260° C. and a pressure of 0.05 to 0.5 MPa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyetherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. A phenolic antioxidant can be introduced at any stage of copolyetherester formation or after the polymer is prepared. As indicated above, preferably, a phenolic antioxidant is added with the monomers. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer already containing the phenolic antioxidant and hindered amine photostabilizer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A more detailed description of suitable copolyetheresters and procedures for their preparation are further described in U.S. Pat. Nos. 3,023,192, 3,651,014, 3,763,109, 3,766,146, and 4,355,155 the disclosures of which are incorporated herein by reference.

The copolyesteresters (b) consist essentially of high melting segments comprised of repeating short-chain ester units of the formula

(II)

which are as described for copolyetheresters as disclosed hereinbefore. The soft segments in the copolyesterester elastomers are derived from low melting polyester glycols such as poly(butylene adipate) or poly(caprolactone).

Several procedures have been used to prepare multiblock copolyesterester elastomers wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate) Ester exchange at first causes the introduction of blocks of one polyester in the other polyester chain and vice versa. When the desired multi-block polymer structure is formed the catalyst is deactivated to prevent further interchange which ultimately would lead to a random copolyester without any blockiness. This procedure is described in more detail in U.S. Pat. No. 4,031,165 to Saidi et al. Other useful procedures involve coupling of preformed blocks of high and low melting point polyester glycols. Coupling can be accomplished by reaction of a mixture of the blocks with a diisocyanate as described in European Patent No. 00013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks, splitting out caprolactam and joining the blocks through ester linkages. This coupling method is further described in Japanese Patent Publication No. 73/4115. Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerizes on the hydroxyl groups of the high melting point ester block which groups serve as initiators. The resulting product is a relatively low molecular weight triblock polymer having the high melting point block in the middle with low melting point polycaprolactone blocks on each end. The triblock polymer is hydroxyl terminated and may be joined to give a finished product by reaction with a diepoxide such as diethylene glycol diglycidyl ether, see Japanese Patent Publication No. 83/162654.

The copolyetherimide ester elastomers (c) differ from the copolyetheresters (a) only in that repeating hard segments and soft segments are joined through imido-ester linkages rather than simple ester linkages. The hard segments in these elastomers consist essentially of multiple short chain ester units represented by the formula

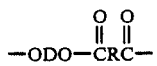
(II)

described hereinbefore. The soft segments in these polymers are derived from poly(oxyalkylene diimide) diacids which can be characterized by the following formula:

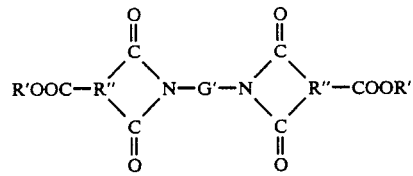
(III)

wherein each R" is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g, benzyl, most preferably hydrogen; and G' is the radical remaining after the removal of the terminal (or as nearly terminal as possible) amino groups of a long chain ether diamine having an average molecular weight of from about 600 to about 12,000, preferably from about 900 to about 4000, and a carbon-to-oxygen ratio of from about 1.8 to about 4.3.

Representative long chain ether glycols from which the polyoxyalkylene diamine is prepared include poly(ethylene ether)glycol; poly(propylene ether)glycol; poly(tetramethylene ether) glycol; random or block copolymers of ethylene oxide and propylene oxide, including propylene oxide terminated poly(ethylene ether) glycol; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether) glycols are poly(propylene ether) glycol and poly(ethylene ether) glycols end capped with poly(propylene ether) glycol and/or propylene oxide.

In general, the polyoxyalkylene diamines will have an average molecular weight of from about 600 to 12,000, preferably from about 900 to about 4000.

The tricarboxylic component is a carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7 naphthalene tricarboxylic anhydride; 3,3',4- diphenyl tricarboxylic anhydride; 3,3'4-benzophenone tricarboxylic anhydride; 1,3,4-cyclopentane tricarboxylic anhydride; 2,2',3-diphenyl tricarboxylic anhydride; diphenyl sulfone-3,3',4-tricarboxylic anhydride, ethylene tricarboxylic anhydride; 1,2,5-naphthalene tricarboxylic anhydride; 1,2,4-butane tricarboxylic anhydride; diphenyl isopropylidene 3,3',4-tricarboxylic anhydride; 3,4-dicarboxyphenyl 3'-carboxylphenyl ether anhydride; 1,3,4-cyclohexane tricarboxylic anhydride; etc. These tricarboxylic acid materials can be characterized by the following formula:

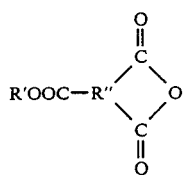
(IV)

where R" is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g., benzyl; most preferably hydrogen.

Briefly, the polyoxyalkylene diimide diacids (III) may be prepared by known imidization reactions including melt synthesis or by synthesizing in a solvent system. Such reactions will generally occur at temperatures of from 100°-300° C., preferably at from about 150° to about 250° C. while drawing off water or in a solvent system at the reflux temperature of the solvent or azeotropic (solvent) mixture.

Although the weight ratio of the above ingredients is not critical, it is preferred that the diol be present in at least a molar equivalent amount, preferably a molar excess, most preferably at least 150 mole percent based on the moles of dicarboxylic acid and polyoxyalkylene diimide diacid combined. Such molar excess of diol will allow for optimal yields, based on the amount of acids, while compensating for the loss of diol during esterification/condensation.

Further, while the weight ratio of dicarboxylic acid to polyoxyalkylene diimide diacid is not critical to form the polyetherimide esters, preferred compositions are those in which the weight ratio of the polyoxyalkylene diimide diacid to dicarboxylic acid is from about 0.25 to about 2, preferably from about 0.4 to about 1.4. The actual weight ratio employed will be dependent upon the specific polyoxyalkylene diimide diacid used and more importantly, the desired physical and chemical properties of the resultant polyetherimide ester. In general, the lower the ratio of polyoxyalkylene diimide diester to dicarboxylic acid the better the strength, crystallization and heat distortion properties of the polymer. Alternatively, the higher the ratio, the better the flexibility, tensile set and low temperature impact characteristics.

Generally, the thermoplastic elastomers comprise the reaction product of dimethylterephthalate, optimally with up to 40 mole percent of another dicarboxylic acid; 1,4-butanediol, optionally with up to 40 mole percent of another saturated or unsaturated aliphatic and/or cycloaliphatic diol; and a polyoxyalkylene diimide diacid prepared from a polyoxyalkylene diamine of molecular weight of from about 600 to about 12,000, preferably from about 900 to about 4000, and trimellitic anhydride. The diol can be 100 mole percent 1,4-butanediol and the dicarboxylic acid 100 mole percent dimethylterephthalate.

The polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, incorporated herein by reference.

The preparation of the copolyetherimide ester is more fully described in U.S. Pat. No. 4,556,705, incorporated herein by reference.

The copolyetheramide elastomers (d) differ from the three types of elastomers previously described in that their recurring hard segments are based on repeating amide units rather than short chain ester units. The repeating amide units may be represented by the formula:

 (V)

or by the formula
—HN—R'''—NHCORR''''CO— (VI)

wherein L is a divalent hydrocarbon radical containing 4-14 carbon atoms, R''' is a divalent hydrocarbon radical of 6-9 carbon atoms and R'''' is a divalent hydrocarbon radical of 6-12 carbon atoms.

The hard segments for these polymers are normally prepared in a separate step in which a suitable lactam or omega-amino acid or a nylon salt are heated in the presence of a minor amount of a dicarboxylic acid which controls the molecular weight of the polyamide oligomer formed. In a second step, the acid-terminated amide hard segments are mixed with an equivalent amount of a poly(alkylene oxide) glycol and heated in the presence of a titanate catalyst to form the elastomer. The glycol provides the soft segments in the polymer. The soft segments can be represented by the formula

 (VII)

wherein G is a divalent radical remaining after the removal of terminal hydroxy groups from a poly(alkylene oxide) glycol having an average molecular weight of about 400-3500. The hard and soft segments are joined through ester linkages. The resulting polymer has an intrinsic viscosity of about 0.8-2.05. In block copolymers with elastomeric properties the average molecular weight of the polyamide sequences preferably is in the range of from about 500 to 3000, most preferably from abut 500 to about 2000. In block copolymers with elastomeric properties, the average molecular weight of the polyoxyalkylene glycol may vary from about 400 to about 6000, preferably from about 500 to about 5000, most preferably from about 400 to about 3000, in particular from about 1000 to about 3000.

The proportion by weight of the polyoxyalkylene glycol with respect to the total weight of the polyetheramide block copolymer can vary from about 5% to about 90%, suitably from about 5% to about 85%.

These polymers and their preparation are described in greater detail in U.S. Pat. No. 4,331,786, incorporated herein by reference.

The thermoplastic elastomer compositions of this invention are foamed into large slabs having a cross-sectional area of the order of six to ten square inches or larger and about one to two inches thick. The foamed thermoplastic elastomers have a low specific gravity of less than about 0.40, usually 0.15-0.25 and have energy return ratios of greater than about 0.50, preferably 0.60. The slabs of foam made from the thermoplastic elastomer compositions have a closed cell structure that is substantially uniform.

The foamed slabs can be made by adding the thermoplastic multi-block copolymer elastomer, usually in the form of pellets, to an extruder through a hopper. The elastomer is heated and masticated in the extruder to produce a molten mass of the elastomer that is mixed and advanced through the extruder. The temperature necessary to produce the molten mass will vary with the particular elastomer to be foamed but generally is within a range of 130°-230° C. The foaming agent is either injected or incorporated in the thermoplastic elastomer and thoroughly mixed with the molten elastomer as it advances through the extruder. The mixture of molten elastomer and foaming agent is cooled as it advances through the extruder. The mixture is cooled to a temperature at which the viscosity of the elastomer is adequate to retain the foaming agent when the mixture is subjected to conditions of lower pressure and is allowed to expand. After cooling, the mixture is extruded into a holding zone maintained at a temperature and pressure that prevents foaming of the mixture. The holding zone has an outlet die having an orifice opening into a zone of lower pressure, such as atmosphere pressure, where the mixture foams. The die orifice is externally closable by a gate. The movement of the gate does not disturb the foamable mixture within the holding zone. The foamable mixture is extruded from the holding zone by a movable ram which forces the foamable mixture out of the holding zone through the die orifice at a rate greater than that at which substantial foaming in the die orifice occurs and less than at which melt fracture occurs. Generally, this ranges between about 1000-5000 lbs/hr. Optionally, an extruder that is sufficiently large can be used to extrude the foamable melt through the die at a rate great enough to prevent foaming in the die orifice. Upon passing through the die orifice into the zone of lower pressure, the foamable mixture is allowed to undergo substantially uniform and free expansion to produce the desired large size slab of foamed thermoplastic elastomer having a low specific gravity. Such method for foaming the thermoplastic multi-block copolymer elastomer to a low density is disclosed in U.S. Pat. No. 4,323,528, the disclosure of which is incorporated herein by reference.

As also taught in U.S. Pat. No. 4,323,528, after substantially uniform and free expansion of the foaming mass has occurred, the hot cellular mass is still totally deformable and at that stage can be formed if disposed between two mold halves which are brought together to contact the outer surfaces of the hot cellular mass. Because the cellular mass is still capable of limited further expansion while it is totally deformable, the foam mass fills the mold completely and accurately reproduces the shape of the mold.

The foaming agents used to make the low density thermoplastic elastomer can be liquids, solids or inert gases. Suitable foaming agents are hydrocarbons and partially or fully halogenated hydrocarbons. Representative liquid foaming agents include halocarbons such as methylene chloride, trichloromethane, dichlorofluoromethane, trifluoro-chloromethane, difluorotetrachloroethane, dichlorotetrafluoroethane, chlorotrifluoroethane, difluoro-ethane, and hydrocarbons such as butane, isobutane, pentane, hexane, and propane. Solid chemical foaming agents can also be used to foam the thermoplastic elastomers. Representative chemical foaming agents include diazodicarbon-amide and other azo, N-nitroso, carbonate and sulfonyl hydrazides that decompose when heated. Also, inert gases can be used as foaming agents such as nitrogen and carbon dioxide. The preferred foaming agents are hydrocarbons, such as isobutane and halogenated hydrocarbons.

The following examples further illustrate the invention.

PROCEDURE FOR DETERMINING ENERGY RETURN RATIO

The energy return ratio of the foams described in the examples were obtained by a gravity driven drop test following the proposed recommendations of ASTM Committee F08.54 on Athletic Footwear.

This test was performed on an instrumented impact apparatus identified as DYNATUP, which is supplied by General Research Corporation The Dynatup system used for these tests consists of a gravity driven drop weight machine and an IBM PC computer for analysis and presentation of results. This system measures the velocity at impact and the force-time record during impact. From this data, the program generates complete records of force, deflection, energy, time, and velocity.

The test procedure involves dropping a 8.5 kg weight from a height of 5 cm on to the sample. The shape of the surface contacting the sample (tup) was 46 mm diameter flat with chamfered edges. The foam samples are positioned on a rigid steel anvil.

From the force-time and energy-time records stored in the computer, the computer program can calculate values for (1) the maximum energy imparted to the foam by the falling weight and (2) the energy returned by the foam. The ratio of the energy returned by the foam to the maximum energy imparted to the foam is defined as the "energy return ratio". A perfect spring would have an energy return ratio of 1.00.

polymers

The thermoplastic multi-block copolymer elastomers used in the examples were as follows Elastomer A is a copolyetherester elastomer containing 41.3% by weight butylene terephthalate short chain ester units, 12% by weight butylene isophthalate short chain ester units and 46.7% by weight long chain ester units derived from ethylene oxide-capped poly(propylene oxide) glycol containing 30% by weight ethylene oxide units and terephthalic/isophthalic acids. The elastomer has a Shore D hardness of 40 and a melt index at 190° C. of 3g/10 minutes by ASTM D 1238 (2.16 kg weight).

Elastomer B has the same composition and hardness of Elastomer A, but has a melt index at 190° C. of 7g/10 minutes.

Elastomer C is a copolyetheramide elastomer containing 42% by weight of polyamide hard segments derived from lauryl lactam and 53% by weight of soft segments derived from poly(tetramethylene oxide) glycol. The elastomer has a Shore D hardness of 40 and a melt index at 220° C. of 1.2g/10 minutes by ASTM D 1238 (2.16 kg weight).

Elastomer D is a copolyetherester elastomer containing 51.9% by weight of butylene terephthalate short chain ester units and 48.1% by weight long chain ester units derived from ethylene oxide-capped poly(propylene oxide) glycol containing 30% by weight ethylene oxide units and terephthalic acid. The elastomer has a Shore D hardness of 47 and a melt index of 7g/10 minutes at 230° C.

Elastomer E is a copolyetherester elastomer containing 57.4% by weight of butylene terephthalate short chain ester units, 24.6% by weight butylene isophthalate short chain ester units and 18.0% by weight of long chain ester units derived from 1000 MW poly(tetramethylene oxide) glycol and terephthalic/isophthalic acids. The elastomer has a Shore D hardness of 55 and a melt index of 5 g/10 minutes at 190° C.

Elastomer F is a copolyetherester elastomer containing 60% by weight butylene terephthalate short chain ester units and 40% by weight of long chain ester units derived from 1000 MW poly(tetramethylene oxide) glycol and terephthalic acid. The elastomer has a Shore D hardness of 55 and a melt index of 7 g/10 minutes at 220° C.

Elastomer G is a copolyetherester elastomer containing 35% by weight of butylene terephthalate short chain ester units and 65% by weight of long chain ester units derived from 2000 MW poly(tetramethylene oxide) glycol and terephthalic acid. It has a Shore D hardness of 40 and a melt index of 8 g/10 minutes at 220° C.

FOAM PREPARATION

The foams described in the following examples were prepared in a 3 inch diameter, 48:1 extruder. The extruder was equipped with the apparatus necessary to inject foaming agents and the forward portion of the extruder barrel was jacketed for cooling using circulating water. The extruder was attached to a foam accumulator described in U.S. Pat. No. 4,323,528. This accumulator is equipped with a piston for ejecting (extruding) the foamable melt through a closable die. The speed of the piston can be varied to provide various extrusion rates. The use of an accumulator is not necessary to produce foams of large cross-sections with a large extruder. However, its use was required with the relatively small foam extruder used in the examples, which, by itself, would be incapable of producing large cross-sections. The use of a relatively small extruder also conserved raw materials as the foamable melt was extruded at rates of about 1000 to 5000 lbs/hour while the actual output rate of the extruder was about 120 lbs/hour.

EXAMPLE 1

The foam accumulator was equipped with a bow-tie shaped die measuring ⅛ inch thick in the center by 3" wide. Elastomer A was mixed at the hopper of the extruder with 0.1% of "Hydrocerol" CF for cell size control. ("Hydrocerol" is an encapsulated mixture of sodium bicarbonate, citric acid and citric acid salts which liberates carbon dioxide and water under elevated temperatures in the extruder.) The foaming agent, an 80:20 mixture of dichlorotetrafluoroethane (CFC 114) and dichlorodifluoromethane (CFC 12) was injected at the rates shown in Table 1. The output of the extruder was about 120 lbs./hour. After the foaming agent was injected, it was mixed into the polymer and then the mixture was cooled to the proper foaming temperature, about 177° C. The foamable melt exiting the extruder was transferred under pressure to the accumulator where it was stored and released intermittently at a rate of 3000 lbs/hour. The foam planks produced were about one inch thick, had a cross-sectional area of 6 to 10 square inches and specific gravities shown in Table 1.

TABLE 1

| Number | Foaming Agent Level (lbs./hour) | Specific Gravity |
|---|---|---|
| 1 | 2 | 0.32 |
| 2 | 3 | 0.28 |

The foams produced had uniform fine cell structure and had an energy return ratio in excess of 0.55.

EXAMPLE 2

The same apparatus and elastomer used in Example 1 were used in this example. Talc was used as a nucleating agent instead of "Hydrocerol" CF The foaming agents used are enumerated in Table 2 along with specific gravities of the foams prepared The energy return ratio of the foams is also given in Table 2.

TABLE 2

| Number | Foaming Agent Type | Foaming Agent Level (lbs./hour) | Talc Level (% by weight of resin) | Specific Gravity | Energy Return Ratio |
|---|---|---|---|---|---|
| 1 | CFC-12/CFC-114 20:80 | 5 | .15 | 0.24 | 0.597 |
| 2 | CFC-12/CFC-114 20:80 | 7 | .15 | 0.19 | 0.778 |
| 3 | HCFC-142b | 5 | .15 | 0.21 | — |
| 4 | HCFC-22/HCFC-142b 1.8:1 | 2.8 | .30 | 0.25 | 0.812 |
| 5 | HCFC-22/HCFC-142b 1.8:1 | 2.8 | .15 | 0.26 | 0.749 |
| 6 | HCFC-22 | 2.5 | .15 | 0.25 | 0.648 |
| 7 | HCFC-22 | 2.5 | .30 | 0.28 | 0.678 |

In the Table,
HCFC-142b = chlorodifluoroethane
HCFC-22 = chlorodifluoromethane
CFC-114 = dichlorotetrafluoroethane
CFC-12 = dichlorodifluoromethane Foam sample numbers 1 and 2 had a thin, smooth "skin" resulting from the collapse of the outermost bubbles. The "skin" on foam numbers 3 through 7 was thicker and somewhat irregular due to the escape of the foaming agent from the outermost portions of the foam before air could replace it. As shown in Table 2, the foams exhibited good resiliency properties and were useful as innersoles in footwear All samples were about one inch thick and had 6 to 10 square inches of cross-sectional area.

EXAMPLE 3

Using the same apparatus as in example 1, foams were produced using Elastomer A and Elastomer B with isobutane as the foaming agent. Hydrocarbons, such as isobutane, have low permeability through Elastomers A and B so foam produced using hydrocarbon foaming agents should exhibit minimal shrinkage and skin-formation as the foaming agent will not leave the foam faster than air can replace it. The results are shown in Table 3.

TABLE 3

| Number | Elastomer | Isobutane Level (pph) | Talc Level (%) | Specific Gravity |
|---|---|---|---|---|
| 1 | A | 1.0 | 1.2 | 0.23 |
| 2 | A | 1.5 | 1.2 | 0.18 |
| 3 | B | 1.5 | 1.2 | 0.19 |
| 4 | B | 1.0 | 1.2 | 0.23 | pph = lbs/hour

Foams 1 though 4 had a uniform cell structure and a very thin smooth skin. All samples were suitable for use as innersoles in footwear and had energy return ratios in excess of 0.55. Better results were obtained with Elastomer B when it was foamed at a lower temperature Elastomer A.

EXAMPLE 4

Using the same apparatus described in Example 1, foam samples were prepared from Elastomer C using the ingredients shown in Table 4. Specific gravities of the resulting foams are also given in the table.

TABLE 4

| Number | Foaming Agent | Foaming Agent Level (pph) | Talc Level (%) | Specific Gravities |
|---|---|---|---|---|
| 1 | Isobutane | 0.8 | 1.8 | 0.26 |
| 2 | Isobutane | 1.0 | 1.8 | 0.23 |
| 3 | Isobutane | 1.5 | 1.8 | 0.18 |

Foams 1 and 2 had uniform cell structures and thin smooth skins. Foam 3 showed some evidence of voiding indicating a specific gravity of about 0.18 is about the minimum for this elastomer. The foams have energy return ratios greater than 0.55 and were suitable for use in athletic footwear innersoles.

EXAMPLE 5

The same apparatus as Example 1 was used except that the accumulator was equipped with a smile-shaped die opening with a thickness of 0.165 inches and a width of about 7 inches. The edges were slightly thicker than the center of the die so as to produce uniform thickness planks of about 1.0 to 2.0 inches thick and 15 to 20 inches wide. Elastomer D was used with about 0.8% by weight of talc added at the hopper. With the blowing agent, a 20:80 mixture of CFC-12/CFC-114 injected at 5 pounds per hour, good foam was produced with specific gravities of 0.21-0.24 and energy return ratios greater than 0.50. The foam produced with Elastomer D was relatively firm It is useful in shock absorbing applications under heavy loads.

EXAMPLE 6

Using the same apparatus as example 5, Hytrel foam was produced using Elastomer E and isobutane foaming agent. Talc was added at the hopper at about 1.2% and isobutane was injected at 1 pound per hour. The results are shown in Table 5.

TABLE 5

| Number | Approximate Foaming Temp. (°C.) | Specific Gravity |
|---|---|---|
| 1 | 171 | 0.26 |
| 2 | 163 | 0.22 |

The higher temperature produced a foam with a higher density, but which was somewhat softer. These foams are relatively hard at these densities It is useful for shock absorption of heavy impacts.

EXAMPLE 7

The same apparatus as used in the previous example 5 was used to produce foam planks from Elastomer F. HCFC-142b was used as a blowing agent. With 2% talc added at the hopper and the HCFC 142b injected at 2.5 pounds per hour, a foam having a specific gravity of 0.28 was produced. The temperature window for foaming this elastomer was very narrow. The cell structure of the foam produced was large and rather irregular. The foam was hard and would be useful for handling heavy impacts.

EXAMPLE 8

The same apparatus and foaming agent as used in Example 5 were used to produce foam planks from Elastomer G (except talc was added at 1.6%). The lowest specific gravity attainable was found to be 0.30-0.32. It had a very narrow processing window for good foam. The results are shown in Table 6.

TABLE 6

| Number | Blowing Agent Level (pph) | Approximate Foaming Temp (°C.) | Specific Gravity |
|---|---|---|---|
| 1 | 0.7 | 166 | 0.34 |
| 2 | 0.8 | 182 | 0.31 |
| 3 | 1.0 | 166 | 0.40 |

Numbers 1 and 3 were partially collapsed as evidenced by a coarse irregular surface. The foams had energy return ratios greater than 0.50.

We claim:

1. A foamed thermoplastic elastomer having a substantially uniform cell structure which comprises a foamed thermoplastic multi-block copolymer elastomer having a closed cell structure and having a specific gravity of less than about 0.35, an energy return ratio greater than about 0.50 when compressed and released, as determined by the recommended method of ASTM Committee F08.54 on athletic footwear, said foam being prepared from a thermoplastic multi-block copolymer elastomer having a Shore D hardness of 25-75 and selected from the group consisting of (1) copolyetheresters, (2) copolyesteresters, (3) copolyetherimide esters and (4) copolyetheramides, said thermoplastic foam being prepared by mixing said multi-block copolymer elastomer at a temperature above its melting point to form a molten mass with a low-boiling liquid forming agent at a pressure sufficient to dissolve and/or disperse said foaming agent in said molten elastomer and extruding the resulting mixture through an orifice into a lower pressure zone whereupon substantially free and uniform foaming and expansion occur and the elastomer solidifies.

2. A foamed thermoplastic elastomer of claim 1 wherein the multi-block copolymer elastomer is a copolyetherester.

3. A foamed thermoplastic elastomer of claim 2 wherein the copolyetherester consists essentially of a multiplicity of recurring long chain ester units and short chain ester units joined head-to-tail through ester linkages, said long chain ester units being represented by the formula:

 (I)

and said short chain ester units being represented by the formula:

 (II)

where G is a divalent radical remaining after the removal of terminal hydroxyl groups from a poly(alkylene oxide) glycol having an average molecular weight of about 400-3500; R is a divalent radical remaining after the removal of carboxyl groups from a dicarboxylic acid having a molecular weight less than about 300; D is a divalent radical remaining after the removal of hydroxyl groups from one or more saturated and/or unsaturated diols having a molecular weight less than about 250; with the proviso that the short chain ester units constitute about 20-85% by weight of the copolyetherester and long chain ester units constitute about 15-80% by weight of the copolyetherester.

4. A foamed thermoplastic elastomer of claim 1 wherein the multi-block copolymer elastomer is a copolyetheramide.

5. A foamed thermoplastic elastomer of claim 4 wherein the copolyetheramide consists essentially of recurring hard segments based on repeating amide units being represented by the formula:

 (V)

 (VI)

wherein L is a divalent hydrocarbon radical containing 4-14 carbon atoms, R''' is a divalent hydrocarbon radical of 6-9 carbon atoms and R'''' is a divalent hydrocarbon radical of 6-12 carbon atoms and recurring soft segments being represented by the formula

—OGO— (VII)

where G is a divalent radical remaining after the removal of terminal hydroxy groups from a poly(alkylene oxide)glycol having an average molecular weight of about 400–3500, said hard and soft segments being joined through ester linkages.

6. A foamable thermoplastic elastomer of claim 1 wherein the thermoplastic multi-block copolymer elastomers have a Shore D hardness of from 30–65.

7. A foamed thermoplastic elastomer of claim 1 wherein the foaming agent is a hydrocarbon or a partially or fully halogenated hydrocarbon.

8. A foamed thermoplastic elastomer of claim 1 wherein the energy return ratio is greater than about 0.60.

* * * * *

UNITED STATES PATENT AND TRADEMARK OFFICE
CERTIFICATE OF CORRECTION

PATENT NO. : 4,988,740

DATED : January 29, 1991

INVENTOR(S) : Timothy H. Walter and Thomas M. Pontiff

It is certified that error appears in the above-identified patent and that said Letters Patent is hereby corrected as shown below:

On the title page, item [73] Assignee: should read:

E. I. du Pont de Nemours and Company
Wilmington, Delaware
    and
Astro-Valcour, Inc.
Rochelle Park, New Jersey Signed and Sealed this Twenty-eighth Day of July, 1992

Attest:

DOUGLAS B. COMER

Attesting Officer   Acting Commissioner of Patents and Trademarks